United States Patent [19]

Ohrbom et al.

[11] Patent Number: 5,756,213
[45] Date of Patent: May 26, 1998

[54] CURABLE COATING COMPOSITION HAVING CARBONATE-CONTAINING COMPONENT

[75] Inventors: Walter H. Ohrbom, Hartland Township; John W. Rehfuss, West Bloomfield; John D. McGee, Highland; Gregory G. Menovcik, Farmington Hills; Paul J. Harris, West Bloomfield, all of Mich.

[73] Assignee: BASF Corporation, Southfield, Mich.

[21] Appl. No.: 698,528

[22] Filed: Aug. 15, 1996

Related U.S. Application Data

[63] Continuation of Ser. No. 540,275, Oct. 6, 1995, abandoned.

[51] Int. Cl.$^6$ .................. C09D 161/28; C09D 161/20; C09D 169/00
[52] U.S. Cl. .................. 428/412; 428/524; 524/537; 524/542; 525/185; 525/186; 525/190; 525/414; 525/450; 525/465; 525/467; 525/509; 525/519
[58] Field of Search .................. 525/185, 186, 525/190, 414, 450, 465, 467, 509, 519; 428/412, 524; 524/537, 542

[56] References Cited

U.S. PATENT DOCUMENTS

| | | |
|---|---|---|
| 2,842,523 | 7/1958 | Tousignant et al. |
| 3,474,072 | 10/1969 | Bissinger . |
| 3,959,201 | 5/1976 | Chang . |
| 4,024,113 | 5/1977 | Ammons . |
| 4,101,603 | 7/1978 | Smith et al. |
| 4,111,910 | 9/1978 | Baggett .................. 528/196 |
| 4,160,754 | 7/1979 | Schapel et al. .................. 528/270 |
| 4,340,497 | 7/1982 | Knopf . |
| 4,506,064 | 3/1985 | Mark .................. 528/176 |
| 4,520,167 | 5/1985 | Blank et al. |
| 4,618,635 | 10/1986 | Osborn et al. |
| 4,628,076 | 12/1986 | Chang et al. |
| 4,631,320 | 12/1986 | Parekh et al. |
| 4,751,112 | 6/1988 | Smith, Jr. et al. |
| 4,814,382 | 3/1989 | Hoy et al. |
| 4,847,329 | 7/1989 | Koleske et al. |
| 5,115,025 | 5/1992 | Koleske et al. |
| 5,134,205 | 7/1992 | Blank . |
| 5,212,015 | 5/1993 | Mitra .................. 428/412 |
| 5,225,461 | 7/1993 | Kamikado et al. |
| 5,252,671 | 10/1993 | Pedain et al. |
| 5,300,328 | 4/1994 | Rehfuss . |
| 5,336,566 | 8/1994 | Rehfuss . |
| 5,356,669 | 10/1994 | Rehfuss et al. |
| 5,360,644 | 11/1994 | Briggs et al. |
| 5,373,069 | 12/1994 | Rehfuss et al. |
| 5,451,656 | 9/1995 | Menovcik et al. .................. 525/467 |

FOREIGN PATENT DOCUMENTS

| | | |
|---|---|---|
| B-62220/90 | 3/1992 | Australia . |
| 636660 | 2/1995 | European Pat. Off. . |
| WO/87/00851 | 2/1987 | WIPO . |
| WO 94/10211 | 5/1994 | WIPO . |

*Primary Examiner*—David Buttner
*Attorney, Agent, or Firm*—Anne Gerry Sabourin

[57] ABSTRACT

A curable coating composition is described comprising (A) a compound comprising a plurality of functional crosslinking groups, at least one of which is a carbamate or urea functional group, which compound also includes at least one carbonate group having the structure:

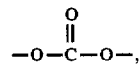

and (B) a curing agent comprising a plurality of groups that are reactive with the functional groups on compound (A).

24 Claims, No Drawings

CURABLE COATING COMPOSITION HAVING CARBONATE-CONTAINING COMPONENT

This is a continuation of application Ser. No. 08/540,275, filed Oct. 6, 1995 now abandoned.

FIELD OF THE INVENTION

This invention relates to curable coating compositions, particularly to curable compositions utilizing a carbamate- or urea-functional compound as one of the components of the composition.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

Such coatings are especially susceptible to a phenomenon known as environmental etch. Environmental etch manifests itself as spots or marks on or in the finish of the coating that often cannot be rubbed out.

Curable coating compositions based on curable components having carbamate or urea functionality have been proposed have been described in the art to provide etch-resistant coatings, e.g., U.S. Pat. No. 5,356,669 and WO 94/10211.

In addition to resistance to environmental etch, a number of other characteristics can be desireable. For example, it may be desireable to provide a coating having a high degree of flexibility. This can be particularly advantageous if the substrate on which the coating is placed is itself flexible, as in the case of plastic, leather, or textile substrates.

It is also desirable to reduce the amount of solvent required in coating compositions in order to reduce the volatile organic content (VOC), which is better for the environment.

Finally, it is desirable to provide a variety of carbamate- or urea-functional to provide coatings with a good combination of properties such as durability, hardness, and resistance to scratching, marring, solvents, and acids.

SUMMARY OF THE INVENTION

According to the present invention, there is provided a coating composition comprising (A) a compound comprising a plurality of functional crosslinking groups, at least one of which is a carbamate or urea functional group, which compound also includes at least one carbonate group having the structure:

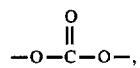

and (B) a curing agent comprising a plurality of groups that are reactive with the functional groups on compound (A).

The present invention provides coatings having a good combination of properties such as durability, hardness, and resistance to scratching, marring, solvents, and acids. Coating compositions according to the invention can also provide low VOC levels, and can be used to prepare coatings having good flexibility for use over flexible substrates.

DESCRIPTION OF THE PREFERRED EMBODIMENTS

According to the present invention, compound (A) has carbamate or urea functionality, comprises at least one carbonate group, and can be prepared in a number of ways. In one embodiment, a compound (A)(1) having a carbamate or urea group (or a group that can be converted to carbamate or urea) and a hydroxyl group is reacted with a compound (A)(2), which may be a dialkyl carbonate, cyclic carbonate, $CO_2$, or to form a carbamate- or urea-functional carbonate-containing product. Reaction of just (A)(1) with (A)(2) will result in a compound having the residues of two (A)(1) compounds linked together by a carbonate group formed from the residue of compound (A)(2). Inclusion of a polyol in the reaction mixture, with appropriate adjustment of the amount of (A)(2) will result in a polycarbonate compound, as is known in the art, terminated with (A)(1) compounds.

Dialkyl carbonates, cyclic carbonates, $CO_2$, diphenyl carbonates, or phosgene may be used as compound (A)(2) to react with and link two (A)(1) compounds via a carbonate linking group. The reaction of hydroxyl groups with dialkyl carbonates is described in GB 1,476,268, the disclosure of which is incorporated herein by reference. The reaction of hydroxyl groups with diphenyl carbonate is described in DE 1,031,512, the disclosure of which is incorporated herein by reference. The reaction of cyclic carbonates with hydroxyl groups can be catalyzed with mono or dicarboxylic acids and is described in DE 2,001,091 and FR 1,391,473, the disclosures of which are incorporated herein by reference.

When phosgene is used, phosgene may be added to a solution of compound (A)(1) at a molar ratio of about 1 mole phosgene to 2 moles (A)(1). This reaction may be conducted at temperatures of less than 7° C. or under pressure in order to maintain phosgene in its liquid state, or alternatively, gaseous phosgene may be bubbled through the system. A salting base (e.g., NaOH) may be used to help drive the reaction. The reaction may be conducted in virtually any aprotic solvent at temperatures of −20° C. to 80° C. and pressures of atmospheric to 40 psi.

Cyclic carbonates or dialkyl carbonates may be used as compound (A)(2) to react with compound (A)(1) by heating (e.g., 80°–200° C. the appropriate molar mixture (2 moles (A)(1) and 1 mole cyclic carbonate or dialkyl carbonate) with a transesterification catalyst such as calcium octoate. Useful dialkyl carbonates include diethyl carbonate, dimethyl carbonate, dipropyl carbonate, diphenyl carbonate, and dibutyl carbonate. Useful cyclic carbonates include propylene carbonate, glycerine carbonate, and dimethyl ethylene carbonate. Cyclic carbonates may also be formed from any alkene by reaction of the unsaturated bond with peroxide to form an oxirane ring, followed by reaction with $CO_2$ to form the cyclic carbonate. The reaction may be driven to completion by removal of the alcohol by-product. Other useful catalysts include metal hydroxides (e.g., KOH), Group I or II metals (e.g., Na, Li), metal carbonates (e.g., $K_2CO_3$) which may be enhanced by use in combination with crown ethers, metal oxides (e.g., dibutyltin oxide), metal alkoxides (e.g., $NaOCH_3$, $Al(OC_3H_7)_3$), metal esters (e.g., stannous octoate, calcium octoate, or protic acids (e.g., $H_2SO_4$), $MgCO_3$, or $Ph_4SbI$. Any solvents used should be inert to transesterification. The catalysts and/or reaction conditions may need to be adjusted to minimize transesterification of any ester groups in compound (A)(1). $CO_2$ may also be used as compound (A)(2) under similar conditions with similar catalysts plus it may be used at pressures of 1 to 40 atm.

A polyol may be included in the reaction mixture to provide polycarbonate chain extension as is known in the art. The amount of dialkyl carbonates, cyclic carbonate, $CO_2$, diphenyl carbonate, or phosgene should be adjusted to maintain a ratio of 2 equivalents of hydroxyl per mole of dialkyl carbonates, cyclic carbonate, $CO_2$, diphenyl carbonate, or phosgene. Diols may be preferred as they provide linear chain extension, although polyols of higher functionality can be used if branching is desired. Virtually any diol or other polyol may be used, depending on the properties desired. In one preferred embodiment, the diol includes a carbamate-pendant diol formed by ring-opening a hydroxyalkyl cyclic carbonate (e.g., 2-hydroxyethyl ethylene carbonate) with ammonia or a primary amine or a urea-pendant diol formed by ring-opening a hydroxyalkyl-substituted oxazolidone with ammonia or a primary amine. Other useful diols include 1,6-hexane diol, 2-ethyl-1,3-hexane diol, neopentyl glycol, cyclohexane-1,4-dimethylol, bisphenol A, polyether polyols such as Pluronic® polyols sold by BASF Corporation, 1,2-hexane diol, and the like. Useful polyols of higher functionality include trimethylol propane, pentaerythritol, acrylic polyols, and the like.

A number of compounds may be used as the compound (A)(1) having a carbamate or urea group (or group that can be converted to carbamate or urea) and a hydroxyl group.

Carbamate groups can generally be characterized by the formula

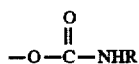

wherein R is H or alkyl, preferably of 1 to 4 carbon atoms. Preferably, R is H or methyl, and more preferably R is H. Urea groups can generally be characterized by the formula

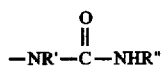

wherein R' and R" each independently represents H or alkyl, preferably of 1 to 4 carbon atoms, or R' and R" may together form a heterocyclic ring structure (e.g., where R' and R" form an ethylene bridge).

Compounds having a carbamate or urea group (or group that can be converted to carbamate or urea) and a hydroxyl group are known in the art and are commercially available. These include, for example, hydroxyalkyl carbamates (e.g., hydroxypropyl carbamate, hydroxybutyl carbamate), hydroxy ureas (e.g., hydroxyethyl ethylene urea), and hydroxyalkyl cyclic carbonates, which can be converted to carbamate by ring-opening the cyclic carbonate with ammonia or a primary amine as described below.

Another group of compounds having a carbamate or urea group (or group that can be converted to carbamate or urea) and a hydroxyl group are compounds formed by reacting a lactone or a hydroxy carboxylic acid with a compound having an active hydrogen group capable of ring-opening the lactone (e.g., hydroxyl, primary amine, acid) or capable of undergoing a condensation reaction with the acid group of the hydroxy carboxylic acid, and a carbamate or urea group or a group that can be converted to carbamate or urea. When a compound having an active hydrogen group and a group that can be converted to carbamate or urea is used to ring-open the lactone, conversion of the group to a carbamate or urea can be accomplished during or after the ring-opening reaction.

Compounds having a carbamate or urea group and an active hydrogen group are known in the art. Hydroxypropyl carbamate and hydroxyethyl ethylene urea, for example, are well known and commercially available. Amino carbamates are described in U.S. Pat. No. 2,842,523. Hydroxyl ureas may also be prepared by reacting an oxazolidone with ammonia or a primary amine or by reacting ethylene oxide with ammonia to form an amino alcohol and then reacting the amine group of that compound or any other amino alcohol with hydrochloric acid, then urea to form a hydroxy urea. Amino ureas can be prepared, for example, by reacting a ketone with a diamine having one amine group protected from reaction (e.g., by steric hindrance), followed by reaction with HNCO (i.e., the product of the thermal decomposition of urea), and then water. Alternatively, these compounds can be prepared by starting with a compound having an active hydrogen and a group that can be converted to carbamate or urea as described below, and then converting that group to the carbamate or urea prior to commencement of the lactone ring-opening reaction.

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60°–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $BU_4PI$, and $(CH_3)_4PI$), potassium salts (e.g., $K_2CO_3$, KI) preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Other groups, such as hydroxyl groups or isocyanate groups can also be converted to carbamate groups. However, if such groups were to be present on the compound and then converted to carbamate after the ring-opening reaction with the lactone, they would have to be blocked so that they would not react with the lactone or with the active hydrogen groups involved in the lactone ring-opening reaction. When blocking these groups is not feasible, the conversion to carbamate or urea would have to be completed prior to the lactone ring-opening reaction. Hydroxyl groups can be converted to carbamate groups by reaction with a monoisocyanate (e.g., methyl isocyanate) to form a secondary carbamate group or with cyanic acid (which may be formed in situ by thermal decomposition of urea) to form a primary carbamate group (i.e., unsubstituted carbamates). This reaction preferably occurs in the presence of a catalyst as is known in the art. A hydroxyl group can also be reacted with phosgene and then ammonia to form a compound having primary carbamate group(s), or by reaction of a hydroxyl with phosgene and then a primary amine to form a compound having secondary carbamate groups. Another approach is to react an isocyanate with a compound such as hydroxyalkyl carbamate to form a carbamate-capped isocyanate derivative. For example, one isocyanate group on toluene diisocyanate can be reacted with hydroxypropyl carbamate, followed by reaction of the other isocyanate group with an excess of polyol to form a hydroxy carbamate. Finally, carbamates can be prepared by a transesterification approach where hydroxyl group reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Groups such as oxazolidone can also be converted to urea after the ring-opening reaction with the lactone. For example, hydroxyethyl oxazolidone can be used to initiate the ring-opening reaction with the lactone, followed by reaction of ammonia or a primary amine with the oxazolidone to generate the urea functional group.

Other groups, such as amino groups or isocyanate groups can also be converted to urea groups. However, if such groups were to be present on the compound and then converted to urea after the ring-opening reaction with the lactone, they would have to be blocked so that they would not react with the lactone or with the active hydrogen groups involved in the lactone ring-opening reaction. When blocking these groups is not feasible, the conversion to carbamate or urea would have to be completed prior to the lactone ring-opening reaction. Amino groups can be converted to urea groups by reaction with a monoisocyanate (e.g., methyl isocyanate) to form a secondary urea group or with cyanic acid (which may be formed in situ by thermal decomposition of urea) to form a primary urea group. This reaction preferably occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a urea-capped isocyanate derivative. For example, one isocyanate group on toluene diisocyanate can be reacted with hydroxyethyl ethylene urea, followed by reaction of the other isocyanate group with an excess of polyol to form a hydroxy carbamate.

One preferred class of compounds having an active hydrogen group and a group that can be converted to carbamate is the hydroxyalkyl cyclic carbonates. Hydroxyalkyl cyclic carbonates can be prepared by a number of approaches. Certain hydroxyalkyl cyclic carbonates like 3-hydroxypropyl carbonate (i.e., glycerine carbonate) are commercially available. Cyclic carbonate compounds can be synthesized by any of several different approaches. One approach involves reacting an epoxy group-containing compound with $CO_2$ under conditions and with catalysts as described hereinabove. Epoxides can also be reacted with β-butyrolactone in the presence of such catalysts. In another approach, a glycol like glycerine is reacted at temperatures of at least 80° C. with diethyl carbonate in the presence of a catalyst (e.g., potassium carbonate) to form a hydroxyalkyl carbonate. Alternatively, a functional compound containing a ketal of a 1,2-diol having the structure:

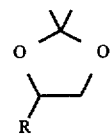

can be ring-opened with water, preferably with a trace amount of acid, to form a 1,2-glycol, which is then further reacted with diethyl carbonate to form the cyclic carbonate.

Cyclic carbonates typically have 5–6-membered rings, as is known in the art. Five-membered rings are preferred, due to their ease of synthesis and greater degree of commercial availability. Six-membered rings can be synthesized by reacting phosgene with 1,3-propane diol under conditions known in the art for the formation of cyclic carbonates. Preferred hydroxyalkyl cyclic carbonates used in the practice can be represented by the formula:

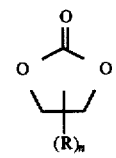

where R (or each instance of R if n is more than 1) is a hydroxyalkyl group of 1–18 carbon atoms, preferably 1–6 carbon atoms, and more preferably 1–3 carbon atoms, which may be linear or branched and may have subsituents in addition to the hydroxyl (which itself may be primary, secondary, or tertiary), and n is 1 or 2, which may be substituted by one or more other substituents such as blocked amines or unsaturated groups. More preferably, R is —$C_mH_{2m}OH$ where the hydroxyl may be primary or secondary and m is 1 to 8, and even more preferably, R is —$(CH_2)_p$—OH where the hydroxyl is primary and p is 1 to 2.

Lactones that can be ring opened by an active hydrogen are well-known in the art. They include, for example, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-nonanoic lactone, γ-octanoic lactone, and pentolactone. In one preferred embodiment, the lactone is ε-caprolactone. Lactones useful in the practice of the invention can also be characterized by the formula:

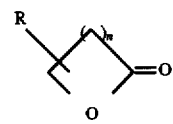

wherein n is a positive integer of 1 to 7 and R is one or more H atoms, or substituted or unsubstituted alkyl groups of 1–7 carbon atoms.

The lactone ring-opening reaction is typically conducted under elevated temperature (e.g., 80°–150° C.). The reactants are usually liquids so a solvent is not necessary. However, a solvent may be useful in promoting good conditions for the reaction even if the reactants are liquid. Any non-reactive solvent may be used, including both polar and nonpolar organic solvents. Examples of useful solvents include toluene, xylene, methyl ethyl ketone, methyl isobutyl ketone, and the like. A catalyst is preferably present. Useful catalysts include proton acids (e.g., octanoic acid, Amberlyst® 15 (Rohm & Haas)), and tin catalysts (e.g., stannous octoate). Alternatively, the reaction can be initiated by forming a sodium salt of the hydroxyl group on the molecules to react with the lactone ring.

The lactone ring-opening reaction provides chain extension of the molecule if sufficient amounts of the lactone are present. The relative amounts of the carbamate or urea compound and the lactone can be varied to control the degree of chain extension. The opening of the lactone ring with a hydroxyl or amine group results in the formation of an ester or amide and an OH group. The OH group can then react with another available lactone ring, thus resulting in chain extension. The reaction is thus controlled by the proportion of lactone in the relative to the amount of the active hydrogen initiator compound. In the practice of the present invention, the ratio of equivalents of lactone to equivalents of active hydrogen groups is preferably from 0.1:1 to 10:1, and more preferably from 1:1 to 5:1. When the lactone is opened with with an acid, the resulting compound has an acid group, which can then be converted to a hydroxyl group by well-known techniques such as reaction with ethylene oxide.

A compound (A)(1) having a hydroxyl active hydrogen group can also be reacted with a hydroxy carboxylic acid to form the carbamate- or urea-functional compound (A). Useful hydroxy carboxylic acids include dimethylhydroxypropionic acid, hydroxy stearic acid, tartaric acid, lactic acid, 2-hydroxyethyl benzoic acid, and N-(2-hydroxyethyl) ethylene diamine triacetic acid. The reaction can be conducted under typical transesterification conditions, e.g., temperatures from room temperature to 150° C. with transesterification catalysts such as such as calcium octoate, metal hydroxides (e.g., KOH), Group I or II metals (e.g., Na, Li), metal carbonates (e.g., $K_2CO_3$) which may be enhanced by use in combination with crown ethers, metal oxides (e.g., dibutyltin oxide), metal alkoxides (e.g., $NaOCH_3$, $Al(OC_3H_7)_3$), metal esters (e.g., stannous octoate, calcium octoate, or protic acids (e.g., $H_2SO_4$), $MgCO_3$, or $Ph_4SbI$. The reaction may also be conducted at room temperature with a polymer-supported catalyst such as Amberlyst-15® (Rohm & Haas) as described by R. Anand, *Synthetic Communications*, 24(19), 2743–47 (1994), the disclosure of which is incorporated herein by reference.

The reaction of compound (A)(1) with compound (A)(2) (and conversion of the group(s) that are convertible to carbamate or urea) will itself result in a single carbonate group in a compound having carbamate or urea functionality. Polycarbonate chain extension can also be obtained by techniques known in the art. For example, inclusion of a polyol in the above-described carbonate-forming reaction will result in polycarbonate formation via a transesterification reaction between the polyol and the $CO_2$, dialkyl carbonate, diphenyl carbonate, or cyclic carbonate. If needed in order to promote sufficient chain growth, the compound (A)(1) having a carbamate or urea group (or group that can be converted to carbamate or urea) and a hydroxyl group may be introduced as a capping agent after sufficient polycarbonate chain growth from the polyol and compound (A)(2) has been achieved.

In another embodiment of the invention, the compound (A) is the reaction product of a substituted or unsubstituted alkyl carbamate (e.g., methyl carbamate, butyl carbamate, hydroxypropyl carbamate) with a polycarbonate having a plurality of hydroxyl groups attached thereto. Such polycarbonate polyols are known in the art and are described, for example, in U.S. Pat. No. 4,024,113, the disclosure of which is incorporated herein by reference. They can be prepared by the transesterification reaction of $CO_2$, a dialkyl carbonate, diphenyl carbonate, phosgene, or a cyclic carbonate with an excess of a polyol using techniques and catalysts as described above. Examples of useful polyols can include 1,6-hexane diol, 2-ethyl-1,3-hexane diol, neopentyl glycol, cyclohexane-1,4-dimethylol, bisphenol A, polyether polyols such as Pluronic® polyols sold by BASF Corporation, 1,2-hexane diol, and the like. Useful polyols of higher functionality include trimethylol propane, pentaerythritol, acrylic polyols, and the like.

The transesterification reaction between the carbamate compound and the polycarbonate polyol should utilize a catalyst. Such catalysts are known in the art, and are preferably organometallic complexes. Suitable catalysts include tin complexes, such as dibutyltin oxide, dibuyltin dilaurate, dibutyltin diacetate, dibutyltin dimethoxide. Other catalysts, such as aluminum complexes (e.g., aluminum isopropoxide), zinc complexes, titanates, or acid catalysts (e.g., octanoic acid) can also be used. The catalysts and/or reaction conditions may need to be adjusted to minimize interaction with any ester or carbonate groups present in the (A)(1) compound.

In yet another embodiment, the compound (A) can be formed by the above-described standard reaction techniques involving a polyol and a $CO_2$ source (e.g., ethylene carbonate, diethyl carbonate, $CO_2$) or phosgene, where the polyol includes a diol having a pendant carbamate group or a pendant urea group. Diols having a pendant carbamate group can be formed by ring-opening a hydroxyalkyl-substituted cyclic carbonate with ammonia or a primary amine using known techniques. Diols having a pendant urea group can be formed by ring-opening a hydroxyalkyl-substituted oxazolidone with ammonia or a primary amine using known techniques.

The composition of the invention is cured by a reaction of the carbamate- or urea-functional compound (A) with a component (B) that is a compound having a plurality of functional groups that are reactive with the carbamate or urea groups on component (A). Such reactive groups include active methylol or methylalkoxy groups on aminoplast crosslinking agents or on other compounds such as phenol/ formaldehyde adducts, siloxane or silane groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), N-methylol acrylamide emulsions, isobutoxy methyl acrylamide emulsions, polyanhydrides (e.g., polysuccinic anhydride), and siloxanes or silanes (e.g., dimethyldimethoxy silane). Aminoplast resin such as melamine formaldehyde resin or urea formaldehyde resin are especially preferred. Also preferred are aminoplast resins where one or more of the amino nitrogens is substituted with a carbamate group for use in a process with a curing temperature below 150° C., as described in U.S. Pat. No. 5,300,328.

A solvent may optionally be utilized in the coating composition used in the practice of the present invention.

The coating composition according to the present invention can be applied without solvent, especially if the degree of chain extension for component (A) is limited. However, in many cases, it is desirable to use a solvent in the coating composition as well. This solvent should act as a solvent with respect to both the carbamate- or urea-functional compound (A) as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, amyl acetate, ethylene glycol butyl ether-acetate, propylene glycol monomethyl ether acetate, xylene, N-methylpyrrolidone, or blends of aromatic hydrocarbons. In another embodiment, the solvent can be water or a mixture of water with co-solvents.

The coating composition used in the practice of the invention may include a catalyst to enhance the cure reaction. For example, when aminoplast compounds, especially monomeric melamines, are used as component (B), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

Although a solvent may be present in the coating composition in an amount of from about 0.01 weight percent to about 99 weight percent, it is preferably present in an amount of less than 35%, more preferably less than 25% and most preferably less than 15%. The coating composition preferably has a VOC (VOC is defined herein as VOC according to ASTM D3960) of less than 3.5 lbs/gal, more preferably less than 2.5 lbs/gal, and most preferably less than 1.5 lbs/gal.

Coating compositions can be coated on the article by any of a number of techniques well-known in the art. These include, for example, spray coating, dip coating, roll coating, curtain coating, and the like. For automotive body panels, spray coating is preferred. One advantage that can be achieved with coating compositions according to the invention is that coatings with a high degree of flexibility can be prepared. Accordingly, in a preferred embodiment, the substrate onto which the coating is applied is flexible, such as plastic, leather, or textile substrates.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

In one preferred embodiment, the coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80. In other preferred embodiments, the coating composition may be utilized to prepare high-gloss or low-gloss primer or enamel coatings.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 2% to 350%, based on the total weight (not including solvent) of components A and B (i.e., a P:B ratio of 0.02 to 3.5).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and siloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The coating composition according to the present invention is curable even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15-25 minutes for blocked acid catalyzed systems and 10-20 minutes for unblocked acid catalyzed systems.

The invention is further described in the following examples.

Preparation 1

A three-necked 1-liter flask was equipped with an agitator, thermocouple, nitrogen line, and condenser. To the flask were added 59.5 parts hydroxypropyl carbamate, 171.2 parts ε-caprolactone, 98.8 parts xylene, and 0.4 parts stannous octoate under nitrogen atmosphere. The mixture was heated to 130° C. for a period of 10 hours, at which point 0.2 parts additional stannous octoate were added. The mixture was heated to 145° C. for a period of 1 hour and cooled.

Preparation 2

A three-necked 1-liter flask was equipped with agitator in the center neck, a thermocouple and nitrogen line in one neck and a trap in the third to condense and collect volatiles with a mixture of dry ice and isopropanol.

125.0 parts of Preparation 1, 11.2 parts diethyl carbonate, and 4.0 parts dibutyltin dimethoxide were added to the flask under nitrogen amtosphere. Heat was applied such that temperature was maintained around 100° C. for three hours during which time volatiles were collected in the trap. Recovered ethanol as well as diethyl carbonate distilled to trap were monitored by gas chromatograph. Periodically, additions of diethyl carbonate were made to the flask to replenish loss to the trap. The mixture was heated for an additional period of 10.5 hours at temperatures ranging from 90°–132° C. with continued monitoring of recovered ethanol and replenishment of diethyl carbonate as needed.

The resulting resin was reduced with 29.8 parts amyl acetate.

EXAMPLE 1

A clearcoat was prepared by combining 10 parts Preparation 2, 2 parts Resimene® 747, 1.8 parts Solvesso® Aromatic 100 solvent mixture, and 0.48 parts docecylbenzylsulfonic acid. Once homogenious, the mixture was drawn over a glass plate, and cured at 250° F. for 30 minutes. The result was a tough, flexible, solvent-resistant coating.

The invention has been described in detail with reference to preferred embodiments thereof. It should be understood, however, that variations and modifications can be made within the spirit and scope of the invention.

What is claimed is:

1. A curable coating composition comprising
  (A) a compound comprising a plurality of functional crosslinking groups, at least one of which is a carbamate functional group having the structure:

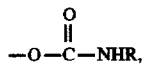

wherein R is H or alkyl, or a urea functional group having the structure:

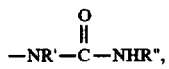

wherein R' and R" each independently represents H or alkyl, or R' and R" together form a heterocyclic ring structure,
  which compound also includes at least one carbonate group having the structure:

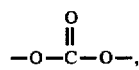

and
  (B) a curing agent comprising a plurality of groups that are reactive with the functional groups on compound (A).

2. A coating composition according to claim 1 wherein said compound (A) is the reaction product of a process comprising the steps of:
  (A) reacting
    (1) a compound comprising at least one carbamate or urea group or a group that can be converted to carbamate or urea, and at least one hydroxyl group, and
    (2) $CO_2$, a dialkyl carbonate, diphenyl carbonate, or a cyclic carbonate; and
  (B) converting the group that can be converted to carbamate or urea, if present, to carbamate or urea.

3. A coating composition according to claim 2 wherein said compound (1) is a hydroxyalkyl carbamate.

4. A coating composition according to claim 2 wherein said compound (1) is a hydroxyalkyl-substituted cyclic carbonate.

5. A coating composition according to claim 2 wherein said compound (1) is the reaction product of
  (a) a compound comprising a carbamate or urea group or a group that can be converted to a carbamate or urea group, and an active hydrogen group that is reactive with (b), and
  (b) a lactone or a hydroxy carboxylic acid.

6. A coating composition according to claim 1 wherein said compound (A) is the reaction product of a process comprising the steps of:
  (A) reacting
    (1) a compound comprising at least one carbamate or urea group or a group that can be converted to carbamate or urea, and at least one hydroxyl group,
    (2) a polyol, and
    (3) $CO_2$, a dialkyl carbonate, diphenyl carbonate, or a cyclic carbonate; and
  (B) converting the group that can be converted to carbamate or urea, if present, to carbamate or urea.

7. A coating composition according to claim 6 wherein said polyol includes a polyol compound having at least one carbamate group attached thereto.

8. A coating composition according to claim 6 wherein said compound (1) is a hydroxyalkyl carbamate.

9. A coating composition according to claim 6 wherein said compound (1) is a hydroxyalkyl-substituted cyclic carbonate.

10. A coating composition according to claim 6 wherein said compound (1) is the reaction product of
  (a) a compound comprising a carbamate or urea group or a group that can be converted to a carbamate or urea group, and an active hydrogen group that is reactive with (b), and
  (b) a lactone or a hydroxy carboxylic acid.

11. A coating composition according to claim 1 wherein said compound (A) is the reaction product of a substituted or unsubstituted alkyl carbamate with a polycarbonate having a plurality of hydroxyl groups attached thereto.

12. A coating composition according to claim 1 wherein said compound (A) includes at least one polycarbonate segment.

13. A coating composition according to claim 1 wherein compound (B) is an aminoplast.

14. A coating composition according to claim 13 wherein said aminoplast is a melamine resin.

15. A coating composition according to claim 1 having a VOC of less than 3.5 lbs/gal.

16. A coating composition according to claim 1 having a VOC of less than 2.5 lbs/gal.

17. A coating composition according to claim 1 having a VOC of less than 1.5 lbs/gal.

18. A coating composition according to claim 1 that is a liquid and comprises less than 35 weight percent of nonreactive organic solvent.

19. A coating composition according to claim 18 that is a liquid and comprises less than 25 weight percent of nonreactive organic solvent.

20. A coating composition according to claim 18 that is a liquid and comprises less than 15 weight percent of nonreactive organic solvent.

21. A coating composition according to claim 1 that is a clear coating composition.

22. A coating composition according to claim 1, further comprising a pigment.

23. An article comprising a substrate having thereon a cured coating derived from a coating composition according to claim 1.

24. An article according to claim 23 wherein said substrate is a flexible substrate.

* * * * *